United States Patent [19]

Jacobs

[11] 4,122,834

[45] Oct. 31, 1978

[54] VENTILATING, COOLING AND HEAT RECLAIMING APPARATUS FOR COOKING EQUIPMENT

[76] Inventor: Eugene A. Jacobs, 7112 Darlington Dr., Baltimore, Md. 21234

[21] Appl. No.: 784,640

[22] Filed: Apr. 4, 1977

[51] Int. Cl.² ............................ F24C 15/08; F23J 11/00
[52] U.S. Cl. ............................ 126/299 D; 55/DIG. 36; 165/DIG. 12
[58] Field of Search ........... 126/299 D; 165/DIG. 12; 55/DIG. 36

[56] References Cited

U.S. PATENT DOCUMENTS

| | | | |
|---|---|---|---|
| 2,862,434 | 12/1958 | Edwards | 165/DIG. 12 |
| 3,194,308 | 7/1965 | Haried | 165/DIG. 12 |
| 3,260,189 | 7/1966 | Jensen | 126/299 D |
| 3,400,649 | 9/1968 | Jensen | 126/299 D |
| 3,698,378 | 10/1972 | Rosenberg et al. | 126/299 D |
| 3,827,343 | 8/1974 | Darm | 126/299 D |
| 3,968,833 | 7/1976 | Strindehag et al. | 165/DIG. 12 |
| 3,980,072 | 9/1976 | Jacobs | 126/299 D |

Primary Examiner—Ronald C. Capossela
Attorney, Agent, or Firm—Cushman, Darby & Cushman

[57] ABSTRACT

A ventilating, cooling, and heat reclaiming system for use with cooking equipment such as commercial ranges and grills whereby grease laden exhaust air passes through a grease filter or extractor and then past a cooling coil through which water is circulated so as to improve grease removal and reclaim heat from exhaust air to heat outdoor supply air. The heated water from the coil is supplied to a further coil disposed in the path of outdoor supply air via a three way valve having two outlets and a mixing valve. The mixing valve varies temperature of water in the further coil to maintain constant the temperature of the supply air and water not supplied to the further coil is supplied to a hot water generator by the three way valve.

8 Claims, 3 Drawing Figures

VENTILATING, COOLING AND HEAT RECLAIMING APPARATUS FOR COOKING EQUIPMENT

BRIEF DESCRIPTION OF THE PRIOR ART AND SUMMARY OF THE INVENTION

The invention relates to ventilating, cooling and heat reclaiming apparatus for cooking equipment or indeed any type of equipment heated by gas, oil, steam, electricity or other fuel including ranges, griddles, fry-pans, kettles, steamers, friers, broilers, ovens and the like, requiring ventilating apparatus to remove sensible heat vapors and grease laden air from the vicinity of the cooking equipment.

Various types of ventilating apparatus are now in use with such equipment for removing sensible heat vapors and grease laden air. These include updraft shelf-type hoods or canopy hoods with mesh filters or grease extractors built in various configurations from a low shelf-type close to the cooking surface to canopy types which may be as high as seven feet above the floor. The shelf-type units generally have enclosed backs and partially enclosed sides. Some canopy hoods also have enclosed backs and partially enclosed sides. Grease extractor type hoods use permanent or removable baffles combined with relatively high velocity openings or slots to capture hot exhaust air and remove grease from it. These apparatus sometimes have wash down sprays built into them for removal of collected and accumulated grease. Some of these are normally operated dry, except for the wash-down period, and others are operated wet with cold water sprays which provide a continuous air-wash during operation. Some use removable cartridges without wash-down or spray of any sort. Some apparatus also is arranged with a double-duct structure to extract sensible heat from the hot exhaust air to assist in heating supply make-up air. The patent to Brown U.S. Pat. No. 3,800,869 shows another arrangement in which the grease laden exhaust vapors are by-passed into the input air to provide some pre-heating.

Another approach to removal of grease and the like from exhaust air is to combust the grease in a separate combustion chamber. For example, the patent to Rosenberg et al U.S. Pat. No. 3,698,378 shows an arrangement in which the exhaust gases are heated by a heat exchanger prior to entrance into a combustion chamber. In the Rosenberg et al structure, a second heat-exchanger is used to cool the exhaust vapors from the combustion chamber.

It is known that reducing the temperature of grease laden exhaust vapors leads to greater deposition of those vapors on a filter and reduces generally the pollutants which are discharged to the atmosphere. The patent to Jensen U.S. Pat. No. 3,260,189 shows an arrangement in which grease-laden exhaust air passes through a filter and then past a series of cooling coils through which water is circulated.

According to the present invention, grease laden exhaust air from a cooking apparatus or the like is drawn through a conventional grease extraction device and then cooled by movement past a cooling coil through which water is circulated, thus increasing the efficiency of grease extraction and reducing the pollutants in the cooled exhaust air. The heat in the exhaust air which is transferred to the flowing water in the cooling coils is then used to pre-heat supply air drawn from the outside of the unit (e.g., outside the building) and/or to pre-heat water which is used in the building, e.g., for cooking or otherwise. More particularly, the water from the cooling coil is passed through a further coil past which outdoor supply air moves into the system. A valve arrangement maintains the temperature of the water supplied to the further coil at a constant temperature by mixing the water from the cooling coil with cold water. Thus, efficiency of energy use in the heating system is maximized while at the same time efficiency of grease extraction is also improved.

Other objects and purposes of the invention will be clear from the following detailed description of the drawings.

DETAILED DESCRIPTION OF THE DRAWINGS

Figure 1:
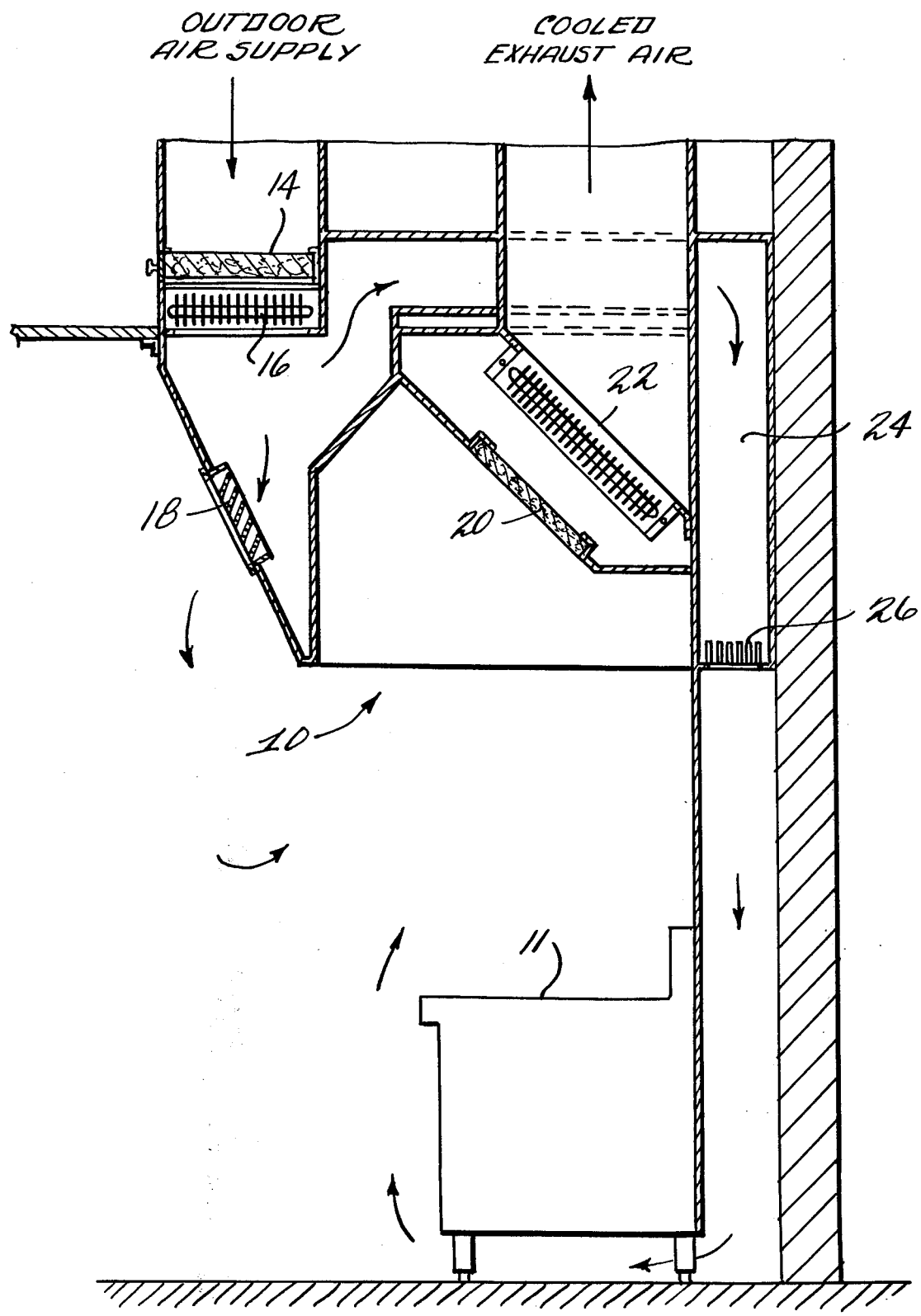
FIG. 1 shows a schematic side-view of the cooling apparatus of the present invention.

Reference is now made to FIG. 1 which illustrates a first embodiment of the invention. Ventilating apparatus in the form of a canopy 10 is mounted in operative position above a conventional range 11 which is an example of cooking equipment of the type with which the present invention can be used.

Air from outside the building passes through a replaceable filter 14 and then past a conventional heating coil 16 which is connected to the conventional cooling coil mounted in the exhaust duct as discussed below. The air is then directed through a conventional air register 18 into the vicinity of range 11 as indicated by the arrows. The air moves across the top of the range surface where it picks up grease, and the grease-laden air then moves through a conventional filterer, i.e., grease-extracting filter device 20, past cooling coil 22, and is exhausted from the building. Part of the supply air may be directed through ductwork 24 via register 26 past the rear of the range, underneath the same and up the front of the range to join the air from the outdoor supply as indicated by the arrows. Cold water from the conventional cold water main is circulated through the cooling coil 22 to cool the grease-laden exhaust air and to improve extraction of the grease therefrom. The warmed water is then passed through coil 16 to pre-heat, at least in part, the air entering the building, thus reducing the amount of thermal energy which must be imparted to that air by the heating system within the building and in general improving the efficiency of operation of the system.

Figure 2:
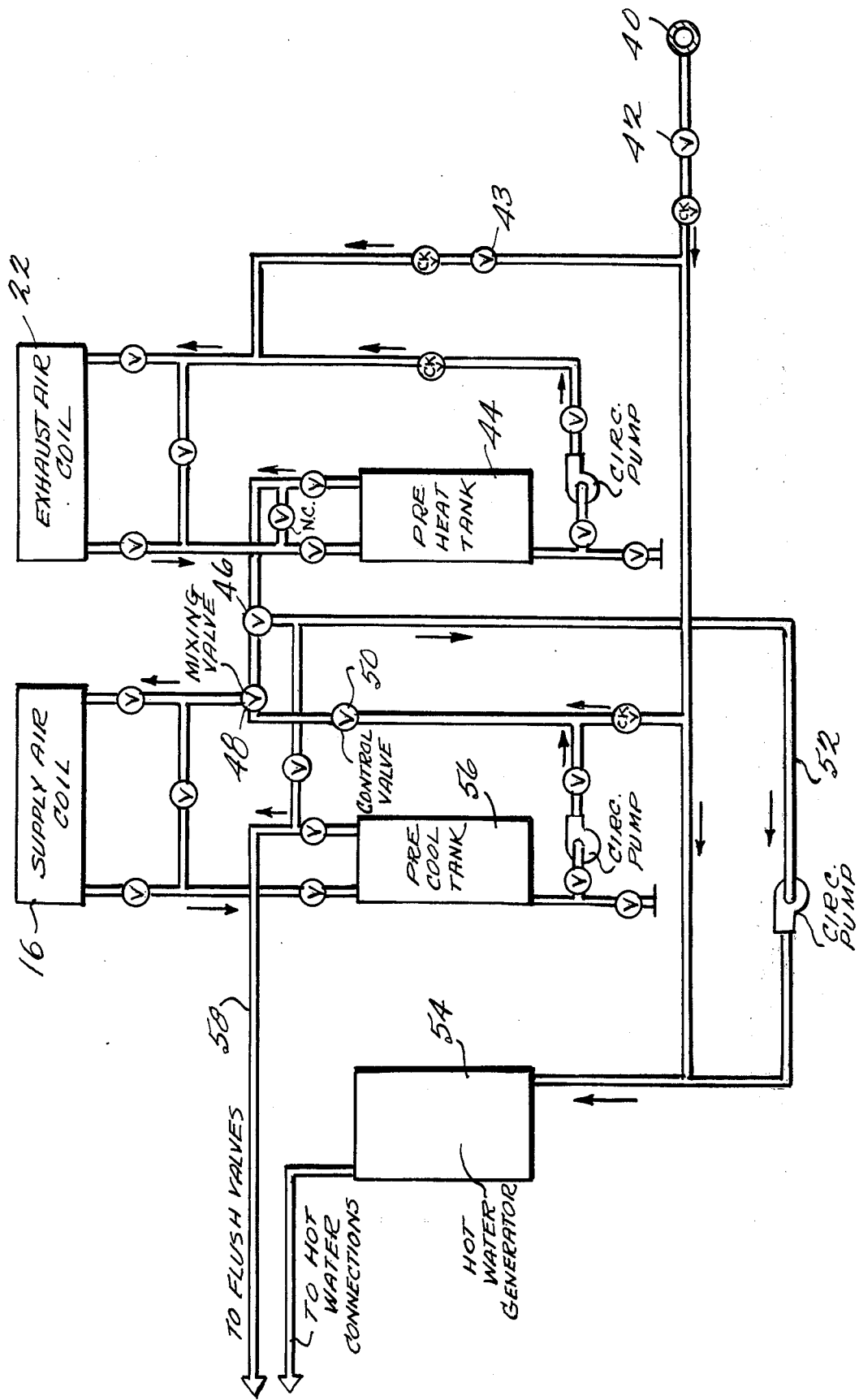
FIG. 2 shows a schematic showing the connections between the heating and cooling coils of the present invention.

Reference is now made to FIG. 2 which schematically illustrates the connections between cooling coil 22 and pre-heat coil 16. Water from a cold water main 40 passes through valves 42 and 43 to circulate through exhaust coil 22, which may be a conventional metal coil or the like. The warmed water leaving coil 22 passes into a pre-heat tank 44 which is provided with a recirculator and which maintains constant flow, since usage of hot water is normally intermittent or varies. The water in tank 44 is pumped to a three-way valve 46. Three-way valve 46 is modulated by a conventional mixing valve 48 under the control of an internal thermostat located in the discharge of coil 16. Valve 48 also modulates the control valve 50 connected to the cold water main 40 so as to maintain the desired discharge air temperature at the front of the hood irrespective of the temperature of the air entering, i.e., in the summer, cold water would be pumped through the coil 16, while in the winter warm water would be pumped through that coil. In both instances, this increases the efficiency of operation of the heating/cooling system in the building. The water which is not diverted by three-way valve 46 to the supply air coil is supplied via line 52 to a conventional hot-water generator tank 54 which then supplies the conventional hot-water connections in the building. Thus, any excess heated water which is not required for supplying air coil 16, and this would probably be the entire water during the summer, is directly supplied to the hot water generator.

The output of the coil 16 is supplied to a cooling tank 56 which recirculates the water as necessary and from there to the hot water generator tank or the conventional building flush valves via line 58.

Figure 3:
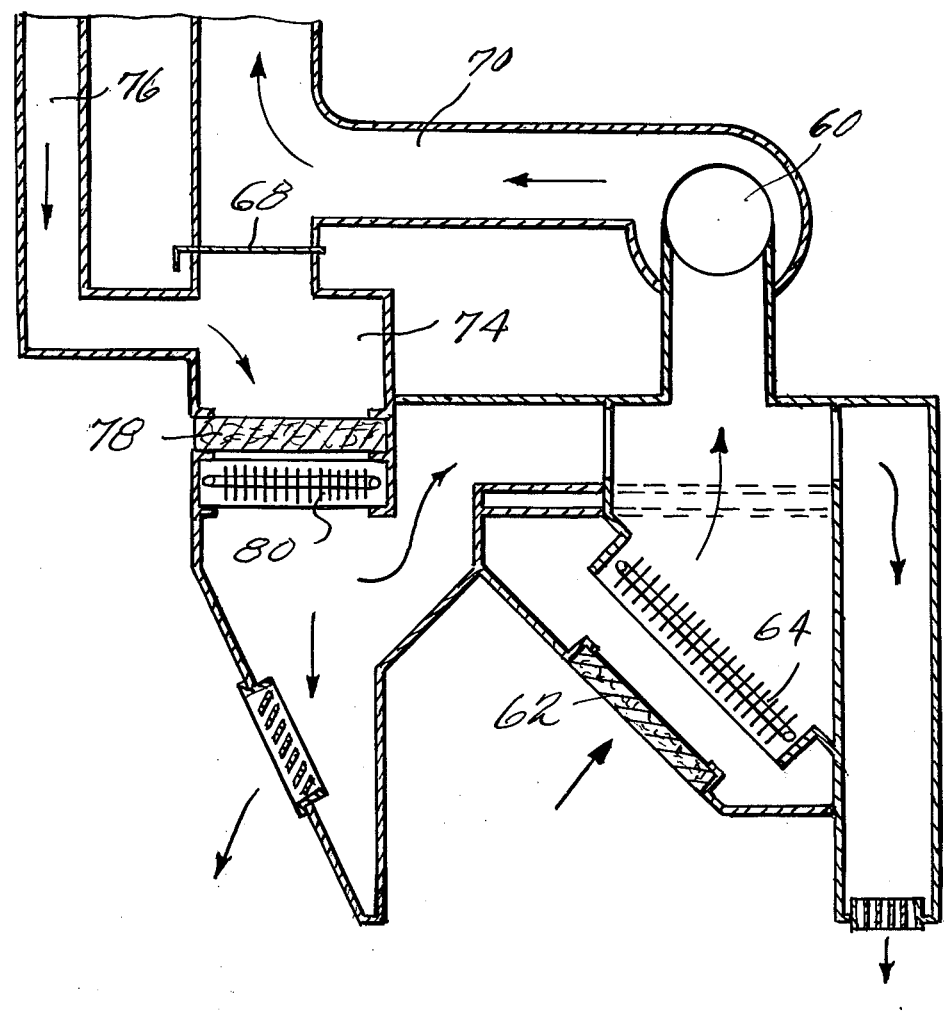
FIG. 3 shows a modification of the present invention in which an exhaust fan is used to pull air through the grease extraction device.

Reference is now made to FIG. 3 which illustrates a further embodiment of the invention in which an exhaust fan 60 is utilized to draw the exhaust air through the grease filter extraction device 62, past the cooling coil 64 which is as described above, and to filter 78 and coil 80 or to atmosphere. A damper 68 is provided between the duct 70, which conducts the exhaust air to the exterior of the building, and the input ducts 74 for the supply air. Damper 68 varies the amount of exhaust air to be reused for the supply. Additional air to make up for the portion of the exhaust air discharged to the atmosphere is supplied via duct 76 and the air in ducts 76 and 74 are mixed prior to passage through the replaceable filter 78 and the heating and cooling coil 80 which is identical to coil 16 as described above.

Many changes and modifications in the above-described embodiment of the invention can, of course, be carried out. Particularly, the apparatus can be combined with the ventilating and cooling apparatus which is described in the applicant's prior U.S. Pat. No. 3,980,072. Accordingly, that scope is intended to be limited only by the scope of the appended claims.

What is claimed is:

1. A venting and cooling system for use with cooking equipment comprising:
   first duct means defining a supply passage for supplying fresh air to the vicinity of the equipment,
   second duct means defining an exhaust passage for exhausting air from the vicinity of the equipment,
   filter means disposed in said exhaust passage for removing particulate matter and droplets from the exhausting air,
   a cooling coil disposed in said exhaust passage for cooling the exhausting air to improve removal of said particulate matter and droplets,
   means connected to said cooling coil for supplying a fluid to said cooling coil at a temperature below the temperature of said exhausting air,
   a further coil disposed in said supply passage for changing the temperature of said supply air,
   means connecting said cooling coil to said further coil for supplying the fluid leaving said cooling coil to said further coil, and
   valve means disposed in said connecting means for controlling flow of said fluid from said cooling coil to said further coil.

2. A system as in claim 1 wherein said filter means includes a grease extractor mounted at the entrance of said duct means so that exhaust air encounters said cooling coil after passage through said extractor.

3. A system as in claim 1 including an exhaust fan in said exhaust passage for drawing air into said second duct means and a damper connecting said exhaust passage, downstream from said cooling coil, to said supply passage, upstream from said further coil.

4. A system as in claim 1 wherein said valve means includes a three-way valve having an input for receiving the fluid leaving said cooling coil, a first outlet for supplying to said further coil said fluid leaving said cooling coil and a second outlet for supplying fluid leaving said cooling coil to a hot fluid generator and a mixing valve connected between said first outlet and said further coil and having an input connected to said fluid supplying means for maintaining the fluid supplied to said further coil at a predetermined temperature.

5. A system as in claim 4 including a pre-heat tank connected between said cooling coil and said input of said three-way valve for receiving and holding the fluid leaving said cooling coil and a pre-cool tank connected to said further coil for receiving and holding the fluid leaving said further coil.

6. A system as in claim 5 wherein each said tank includes means for recirculating held fluid through the coil to which it is connected.

7. A system as in claim 1 wherein said first and second ducts comprise a canopy.

8. A system as in claim 7 including a third duct for directing part of the air passing through said cooling coil downward behind said equipment, beneath said equipment and upwards at the front of said equipment.

* * * * *